United States Patent [19]

Kwieraga

[11] 4,097,180
[45] Jun. 27, 1978

[54] CHASER CUTTING APPARATUS

[75] Inventor: James A. Kwieraga, Durham, Conn.

[73] Assignee: TRW Inc., Cleveland, Ohio

[21] Appl. No.: 759,955

[22] Filed: Feb. 10, 1977

[51] Int. Cl.² ............................................. B23G 5/16
[52] U.S. Cl. .................................. 408/154; 408/169;
408/222
[58] Field of Search ............... 408/154, 155, 156, 168,
408/169, 170, 219–225

[56] References Cited

U.S. PATENT DOCUMENTS

| 1,530,293 | 3/1925 | Breitenstein | 408/169 X |
| 2,661,639 | 12/1953 | Clyde | 408/154 |

Primary Examiner—J. M. Meister
Attorney, Agent, or Firm—Daniel G. Blackhurst

[57] ABSTRACT

The specification and drawings disclose a collapsible tap of the type including an elongated, cylindrical body or housing having an axially extending actuating plunger mounted for selective movement longitudinally of the body. The outer end of the plunger has a generally conical portion which functions to provide camming surfaces. Suitable chaser cutting elements are mounted for radial movement in the body. Each element includes a surface in engagement with a corresponding camming surface of the plunger such that axial movement of the plunger produces radial movement of the elements. The elements are maintained in engagement with the camming surfaces by clip members which extend radially from the conical portion of the plunger with resilient, laterally directed terminal portions that engage grooves formed in the sides of the elements. The terminal portions are related to the grooves in a manner to produce a continuous bias acting to maintain the elements in contact with the camming surfaces while permitting relative axial movement between the elements and the camming surfaces.

9 Claims, 8 Drawing Figures

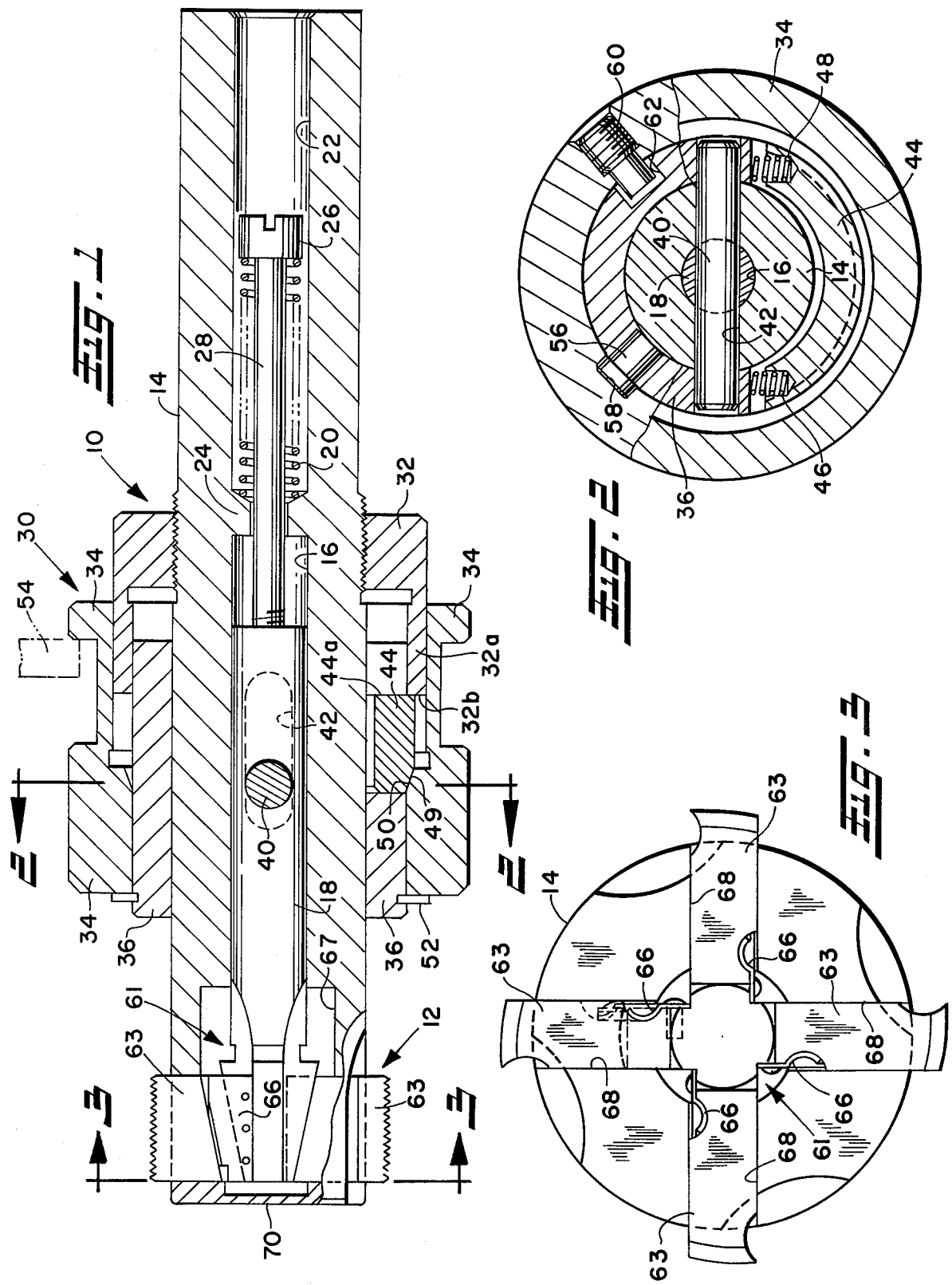

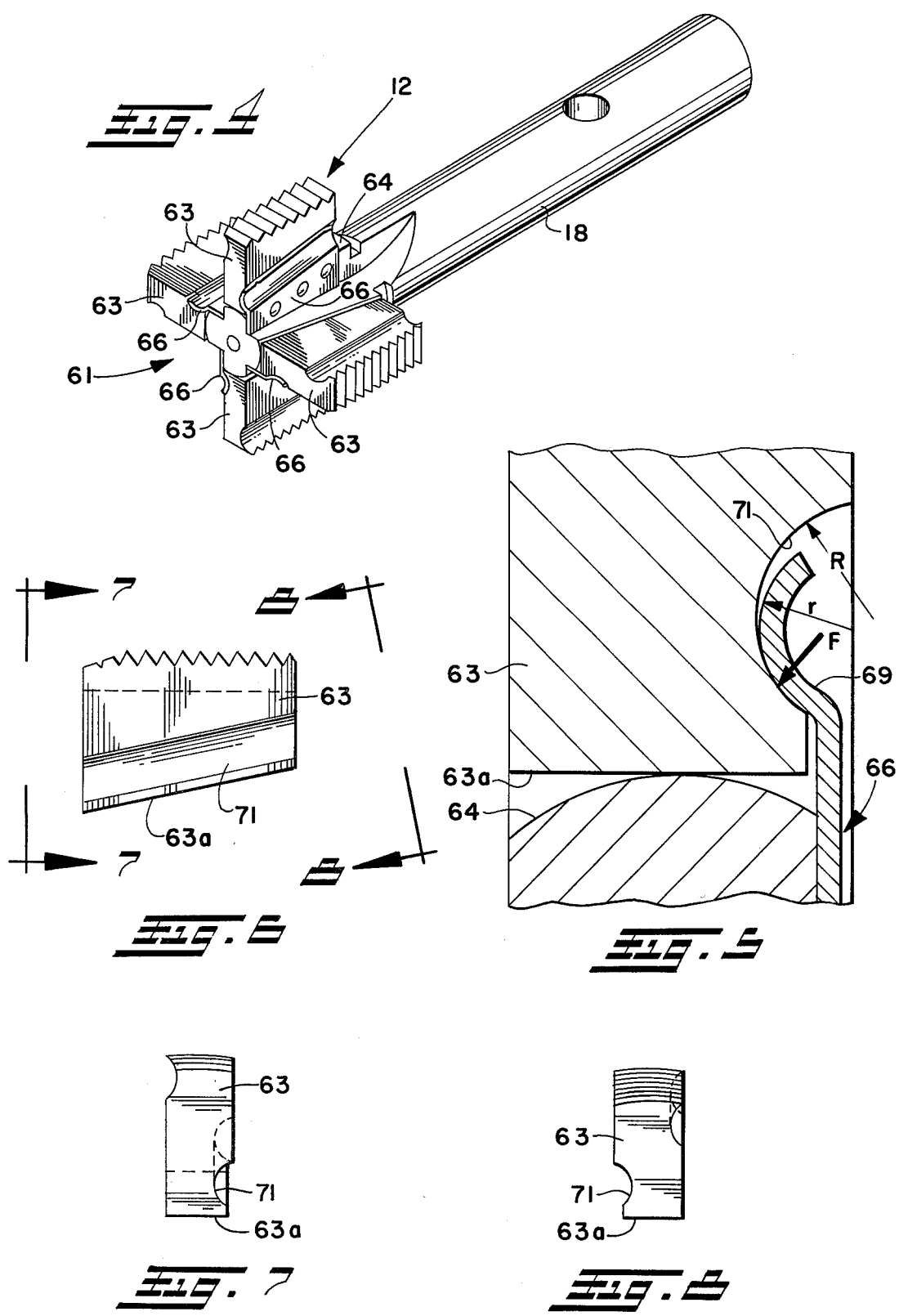

CHASER CUTTING APPARATUS

BACKGROUND OF THE INVENTION

The subject invention is directed toward the art of cutting and, more particularly, to chaser cutting devices of the type which use a plurality of cutting elements or "chasers" mounted for movement between an extended cutting position and a retracted non-cutting position.

The invention will be described with reference to a specific collapsible tap structure; however, as will become apparent, the invention could be embodied in many different types of chaser cutters and threading devices.

The typical prior art collapsible tap comprises a generally cylindrical housing or body having one end adapted to be mounted in a suitable chuck and the other end carrying a plurality of thread cutting chasers. Actuating mechanism is provided to move the chasers to a radially outermost position and hold them there during a threading operation. Thereafter, the mechanism functions to retract the chasers radially inward to a tap "collapsed" position for rapid withdrawal from the tapped opening.

Generally, the actuating mechanism has comprised a push rod or plunger mounted axially of the body for longitudinal reciprocation. The outer end of the plunger has been provided with a plurality of planar, longitudinally inclined cam surfaces circumferentially spaced to engage correspondingly shaped cam surfaces formed on the bottom of each chaser. The chasers are guided for radial reciprocation by suitable slots or grooves formed in the body. Typically, the chasers were drivingly connected with the plunger and held in the body by L-shaped ribs formed integrally with the plunger and extending radially outward. The laterally extending portion of the L-shaped rib interlocked with rectangular grooves formed along the sides of the chasers.

In order to maintain the proper tolerances in the thread being cut to eliminate play or backlash between the chasers and the plunger, it was necessary to hold the plunger and the chaser, particularly the groove, to extremely close tolerances. This could only be achieved by precision machining and grinding operations which were difficult because of the complex shape of the resulting plunger with its integral L-shaped ribs. Additionally, the rib and groove construction resulted in potentially high stress concentrations.

Even with the components manufactured to close tolerances, some inherent play between the chasers and the plunger was unavoidable. Consequently, chatter on the threads being cut could result, as well as, backlash conditions when the tap was adjusted.

BRIEF STATEMENT OF THE INVENTION

The subject invention provides an improved chaser and plunger design which overcomes the above problems. By the use of the subject invention, the chasers are continually maintained firmly in place against the camming surfaces of the plunger. This reduces chaser movement during the cutting operation and minimizes movements caused by vibration or cutting forces. Additionally, the design eliminates or greatly reduces the potential for high stress concentrations, as well as, greatly reducing the amount of precision milling and grinding required in the manufacture of the components. Moreover, the chaser elements themselves are simpler in design and less expensive with more consistent control for cutting size.

In general, according to the subject invention, a device of the general type described is provided with the improvement which includes clip members extending radially from the actuating member for engaging and holding the chaser members in constant engagement with cam surfaces of the actuating member. Each clip member includes a laterally extending, resilient, free end portion which engages a side groove formed in the corresponding chaser. The free end portions are configured and dimensioned relative to the side grooves so as to continuously apply a biasing force having a component acting to maintain the respective chaser in engagement with its cam surface on the actuating member while permitting relative movement between the chasers and the cam surfaces in directions along the cam surfaces.

In accordance with a more limited aspect of the invention, the side grooves formed in the chaser elements have an arcuate cross-sectional configuration. Similarly, the laterally extending side portions of the radially extending clip members are also formed with an arcuate cross-section. However, the radius of the laterally extending portion of the clip member is smaller than the radius of the chaser groove. Additionally, the dimensions of the clip member and the chaser groove are related such that when the chaser is in position on the plunger camming surface the clip member applies a continuous biasing force which acts generally along a limited area of the groove to bias the chaser member toward the cam surface.

Because of the arcuate configuration of the chaser groove, formation of the groove is substantially simpler and stress-raising corners and the like are eliminated. Additionally, because the chaser is continually biased toward the cam surface, there is less possibility of movement between the chaser and the plunger. Consequently, there is less possibility for chatter or backlash. Additionally, the head-end of the plunger can be a simple conically-shaped, machined turning since the resilient nature of the clip does not require extremely close tolerances as was the case with the integral L-shaped rib construction.

OBJECTS OF THE INVENTION

Accordingly, the primary object of the invention is the provision of a chaser and actuating plunger assembly which is simpler to construct and which reduces problems inherent in the prior designs.

A further object is the provision of an apparatus of the type described wherein the chaser members are continually maintained under a biasing force toward the cam surface of the actuating member.

A still further object is the provision of a chaser construction which is simpler and does not require precision machining and grinding of a rectangular actuating groove with its inherent stress raisers.

BRIEF DESCRIPTION OF THE DRAWINGS

The above and other objects and advantages will become apparent from the following description when read in conjunction with the accompanying drawings wherein:

FIG. 1 is a longitudinal cross-sectional view through a collapsible tap assembly incorporating a plunger and chaser arrangement formed in accordance with the subject invention;

FIG. 2 is a cross-sectional view taken on line 2—2 of FIG. 1;

FIG. 3 is a view taken on line 3—3 of FIG. 1;

FIG. 4 is a pictorial view showing the preferred form of plunger and chaser arrangement;

FIG. 5 is a greatly enlarged partial cross-sectional view showing the manner in which the spring clips act to hold the chasers in position against the camming surfaces of the plunger;

FIG. 6 is a side view of a chaser element; and

FIGS. 7 and 8 are end views of the chaser element of FIG. 6 taken on lines 7—7 and 8—8, respectively, of FIG. 6.

DETAILED DESCRIPTION OF THE DRAWINGS

Referring more particularly to the drawings wherein the showings are for the purpose of illustrating a preferred embodiment of the invention only, and not for the purpose of limiting same, FIG. 1 shows the overall arrangement of a typical collapsible tap assembly 10 incorporating an improved actuator or plunger assembly and chaser arrangement 12. As mentioned earlier, the details of the collapsible tap assembly 10 form no particular part of the invention and have been illustrated merely for the purpose of showing one embodiment in which the improved plunger and chaser arrangement can be incorporated.

As shown, the collapsible tap assembly 10 normally includes a main central body 14 having a generally cylindrical configuration and including a central cylindrical bore or opening 16 in which an actuator or plunger 18 is mounted for axial sliding movement. The plunger 18 is maintained under a continual bias to the right (i.e., the chaser retracted or tap collapsed position) by a compression spring 20 which is carried in an axial bore 22 extending inwardly from the right end of shank 14. Spring 20 is compressed between an inner flange 24 and the enlarged head 26 of a stud 28 which extends outwardly from threaded engagement with the plunger 18.

The right hand or shank end of the main body 14 serves as the means for mounting the collapsible tap assembly 10. In order to provide controlled collapsing and expansion movement of the apparatus an actuating or trip mechanism 30 is carried on the central portion of the body 14. The actuating mechanism 30 includes a first adjusting ring member 32 which is adjustably connected through threads to the central portion of the shank 14 in the manner shown. A set screw or the like (not shown) is provided for locking ring member 32 in its adjusted position. Carried about the adjusting ring 32 for axial sliding movement relative thereto is a cylindrical closing sleeve or actuating member 34. As shown, the sleeve 34 is slidably received on an axially extending flange portion 32a of the adjusting ring 32. Mounted within the sleeve 34 and arranged for sliding movement relative to the shank or body 14 and the actuating ring 34 is a generally cylindrical skeleton ring member 36. The skeleton ring 36 is positively connected with the plunger 18 for simultaneous movement therewith. Specifically, as best shown in FIG. 2, a cross pin 40 is received in an opening formed diametrically through the plunger 18 and extends into aligned openings formed in the skeleton ring 36. The plunger 18 and the skeleton ring 36 can move together axially of the shank 14 by virtue of an elongated opening 42 formed in shank 14 and freely receiving the pin 40 (see FIG. 1).

The actuating mechanism 30 is selectively maintained in the chaser expanded position by a pawl member 44 carried in the skeleton ring 36. As best shown in FIG. 2, the pawl 44 has a somewhat crescent shape and is continually biased in a radial direction by suitable compression springs 46 and 48 mounted at its opposite, arcuate spaced ends and bearing against the skeleton ring 36. A camming surface 49 is formed about the left hand end of pawl 44 as shown in FIG. 1. A corresponding camming surface 50 is formed about the inner edge of sleeve 34.

When the actuating member 34 is moved the maximum permissible amount to the left into engagement with the snap ring 52, the pawl member 44 is biased radially outwardly to the position shown. The rear end face 44a of the pawl 44 then engages the left hand face 32b of the adjusting ring 32. This locks the plunger 18 and the skeleton ring 36 in their left most position (as viewed in FIG. 1) relative to the shank 14. In this position the chaser members are in their outermost radial position suitable for a thread cutting operation. As the tapping operation nears completion, the relative movement between the collapsible tap assembly 10 and the associated workpiece being tapped or threaded causes engagement with a tripping mechanism (shown in phantom lines as element 54 in FIG. 1). Continued additional relative movement of the work piece and collapsible tap assembly toward one another causes the trip member 54 to move the actuating sleeve 34 to the right (as viewed in FIG. 1). This cams the pawl member 44 radially inwardly until the end face 44a disengages from the end face 32b of the adjusting ring 32. At that point, the compression spring 20 acts to move the plunger 18 and the skeleton ring 36 to the right producing a contracting movement of the chaser members. To reset the tap to a chaser expanded position, the actuating sleeve 34 is moved back to the left to a position where the pawl member is allowed to move radially outward into a locked position as shown in FIG. 1.

In order to prevent circumferential movement of the actuating sleeve 34 relative to the skeleton ring 36 while permitting free axial movement, there is provided (as shown in FIG. 2) a guide pin 56 which is carried in the skeleton ring 36 and extends outwardly into an elongated, longitudinally extending groove 58 formed in the actuating sleeve 34. Additionally, in order to insure operation of the machanism even upon failure of the spring 20, there is provided a pin 60 which extends inwardly from the actuating sleeve 34 into a groove 62 formed in the skeleton ring 36. The length of the groove 62 is such that a slight additional movement of the actuating sleeve 34 to the right (as viewed in FIG. 1) causes the pin 60 (FIG. 2) to positively engage the skeleton ring and force rearward movement of the skeleton ring and the plunger 18.

The overall construction arrangement of the plunger and chasers and the manner in which the chasers are guided for radial movement in the body 14 can best be understood by reference to FIGS. 1, 3 and 4. In particular, as shown in FIGS. 1 and 4, the left hand or head end of the plunger has an enlarged, generally, conically shaped portion 61 which defines inclined camming surfaces for producing movement of the chasers 63. In the subject embodiment there are four chasers shown; however, it should be appreciated that the actual number of chaser elements provided could vary. The chaser elements 63 are arranged so as to slide freely on the inclined camming surfaces 64. The chasers 63 are permitted to move freely radially under the influence of axial movement of the plunger while being constrained against axial movement by the body 14. As best shown in FIGS. 1 and 3, the body 14 includes clearance slots 67 which extend inwardly from the left hand end of the body (as viewed in FIG. 1). Four longitudinally extending grooves or slots 68 are milled inwardly to intersect with the clearance slots 67. The slots 68 are sized so as to closely receive the chasers 63. As can best be seen from FIGS. 1 and 3, the slots 68 constrain the chasers to permit only radial movement relative to the body 14. The outer ends of the slots 68 are closed by an end plate 70 which is positively connected to the body 14 in any convenient manner such as through the use of machine screws not shown.

Of particular importance to the subject invention is the manner in which the chasers 63 are held in sliding contact with the camming surfaces of the plunger 18. As discussed earlier, prior to the subject invention the head end of the plunger was milled and ground so that the camming surfaces were flat, inclined surfaces and an integral, rigid L-shaped retainer projecting upwardly from adjacent each camming surface. The rigid L-shaped member was received in a longitudinally extending, rectangular slot ground in the side of each individual chaser. As can be appreciated, the head end of the plunger was an extremely complex machining and grinding operation which had to be held to extremely close tolerances. Similarly the chasers themselves had to be an extremely precision component even with respect to the longitudinal groove. In the subject device the noted problems are overcome by an arrangement which greatly simplifies the manufacture of the plungers and the chasers while simultaneously yielding improved functioning. Specifically, according to the subject invention, the plunger head and cam surfaces are formed as a simple, conical turning. The conical head is milled as best shown in FIGS. 3 and 4 so as to leave four outwardly extending chaser camming surfaces 64. Note that the head is milled so that in cross section it has a simple X-shape. Connected to the side of each of the outwardly extending cam surface portions is a spring clip member 66 having the configuration best shown in FIGS. 4 and 5. Each spring clip member 66 is formed from spring steel or similar material having a high degree of resiliency. As shown in FIG. 4, the spring clips 66 are connected to the sides of the outwardly extending cam surface defining members in any convenient manner, such as by spot welding or riveting. The resilient outer free end or retaining portion 69 of each spring clip preferably has an arcuate shape best seen in FIG. 5. Preferably, the laterally extending end portion 69 is formed with a radius $r$. A generally correspondingly shaped arcuate groove 71 is formed in the side of each chaser member 63. As shown the arcuate groove 71 is preferably formed with a radius R which is larger than the radius $r$. The length of outward extension of the spring clip member 66 is related to the positioning of the groove 71 such that engagement between groove 71 and retaining portion 69 takes place in the manner shown in FIG. 5. The inherent resilient nature of the spring clip and the dimensional relationship shown produce a reaction force having a direction generally as indicated by an arrow F. Thus, the chaser 63 is maintained under a positive force toward the associated cam surface 64. Additionally, the clip 66 prevents outward movement of the associated chaser except as the result of axial movement of the plunger 18.

This above-described arrangement has many advantages when compared with the prior designs. For example, as noted, the use of the spring clip maintains the chaser surface 63a (FIG. 5) firmly seated on the conical camming surface 64 of the plunger and controls chaser cutting size by not allowing the chaser to move radially unless the plunger sees axial movement. Additionally, it allows for a substantially less expensive chaser design and easier control for consistency in cutting size. Both the chasers and the plunger are stronger because of the elimination of the potentially higher stress areas of the prior ground, rectangular rib and groove construction.

Because the spring clip holds the chaser firmly in place, chaser movement produced by vibration or cutting forces is minimized to reduce chatter on threads being generated. The construction also allows the chaser to be seated constantly on the cone of the plunger even though the tap has a run-by condition needed to lock the tool in cutting position. When the tap returns to the expanded or locked position, the plunger moves rearwardly slightly to insure locking. During this movement, the plunger clip insures that the chasers remain seated on the cone of the plunger. The conventional integral locking rib construction has inherent play which cannot maintain this firm seating arrangement. Moreover, the spring clip arrangement assures that when size adjustments are made no back-lash condition can exist.

Having thus described by invention, I claim:

1. An apparatus for producing threads or other configurations comprising:
   an elongated body;
   a plunger member mounted for axial movement in said body and having inclined camming surfaces;
   at least one chaser member seated on each of said camming surfaces for sliding movement relative thereto; and,
   spring clip means extending generally radially outwardly from adjacent each camming surface, each clip means having a laterally extending resilient free end portion engaging an associated chaser and applying to said associated chaser a biasing force having a component acting to maintain said associated chaser in contact with its respective camming surface.

2. The apparatus as defined in claim 1 wherein said spring clip means each comprise a resilient metal strip joined to said plunger member.

3. The apparatus as defined in claim 1 wherein said plunger member includes a generally conically shaped end portion which defines said camming surfaces.

4. The apparatus as defined in claim 1 wherein said free end portion of each said spring clip means has a generally arcuate cross-section and engage in an arcuate groove formed in the associated chaser member.

5. The apparatus as defined in claim 4 wherein said free end portion of each said clip means has a generally arcuate cross-section of a radius less than the radius of the arcuate groove formed in the associated chaser member.

6. In a chaser cutting apparatus of the type including an elongated body having an axially movable actuating member defining a camming surface on which is mounted a cutting member adapted to move radially of said body upon axial movement of said actuating member the improvement comprising:
   a spring clip means extending outwardly from said actuating member and having a resilient free end portion engaging said cutting member to maintain said cutting member in engagement with said camming surface while permitting relative movement between said chaser member and said camming surface in a direction along said surface.

7. The improvement as defined in claim 6 wherein said resilient free end portion engages a groove of arcuate cross-section formed in said cutting member.

8. The improvement as defined in claim 7 wherein said free end portion has an arcuate cross-section of a radius less than the radius of said groove, the arcuate shape of said groove and said free end portion eliminating stress raising corners.

9. The improvement as defined in claim 7 wherein said resilient free end portion maintains said cutting member under a continual bias towards said camming surface to eliminate backlash conditions.

* * * * *

UNITED STATES PATENT AND TRADEMARK OFFICE
CERTIFICATE OF CORRECTION

PATENT NO. : 4,097,180
DATED : June 27, 1978
INVENTOR(S) : James A. Kwieraga

It is certified that error appears in the above-identified patent and that said Letters Patent are hereby corrected as shown below:

On the title page, item [21] 759,955" should read -- 758,955 --.

Signed and Sealed this

Fifth Day of June 1979

[SEAL]

Attest:

RUTH C. MASON
Attesting Officer

DONALD W. BANNER
Commissioner of Patents and Trademarks